Nov. 29, 1960 W. MORRILL 2,962,277
APPARATUS FOR CONTINUOUS PROCESS OF STEEL MAKING
Filed May 15, 1958 2 Sheets-Sheet 1

Inventor,
Weston Morrill,
by Gilbert P. Tarleton
His Attorney.

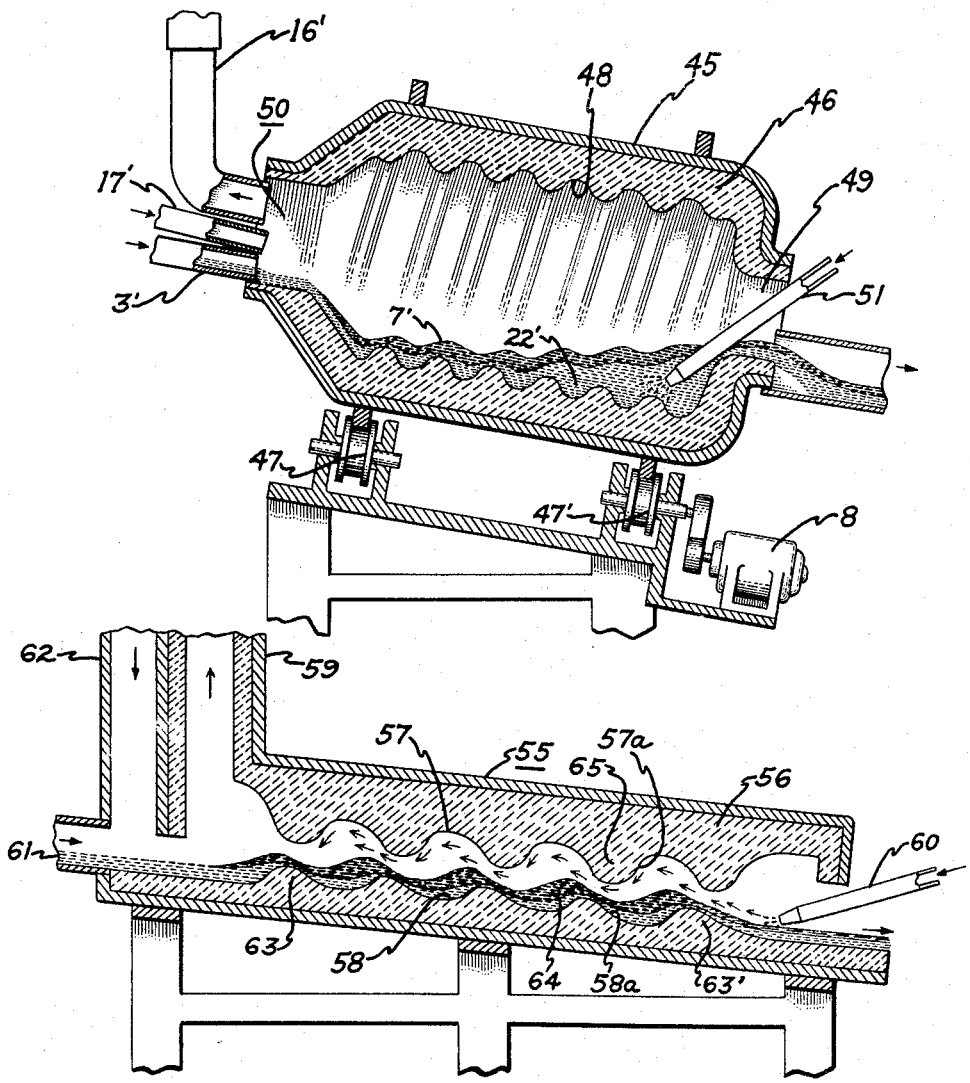

United States Patent Office 2,962,277
Patented Nov. 29, 1960

2,962,277
APPARATUS FOR CONTINUOUS PROCESS OF STEEL MAKING

Weston Morrill, Pittsfield, Mass., assignor to General Electric Company, a corporation of New York Filed May 15, 1958, Ser. No. 735,587

9 Claims. (Cl. 266—36)

The present invention relates to the process of making steel, and more particularly concerns a method and apparatus which makes possible continuous production of steel from the raw ore stage to the finally formed steel product.

As well known, in the usual processes of making steel, iron ore compounds are initially subjected to a smelting procedure to reduce the ore to metallic state, after which the molten iron, known as pig iron, undergoes a refining treatment to attain a more purified state. After suitable separation of impurities from the pig iron during the refining step and removal of slag after the refining procedure, the purified iron is then in condition to be mixed with other materials to produce steel of desired alloy composition, after which the molten steel is poured into suitably shaped molds for solidifying into desired shapes.

The reduction of iron ore to molten pig iron is normally carried out in a continuous reaction in conventional blast furnaces. Various procedures are also known for continuously forming solidified sheets or other forms from molten metal, and in such processes the molten metal is normally poured into a container having an outlet leading to a suitable molding and cooling device for forming solidified metal on a continuous basis.

However, the refining step of the steelmaking process has not heretofore been found adapted to continuous production processes, and in the past the molten unpurified iron drawn from the smelting furnace has always been subjected in batches to the action of oxygen and of slag ingredients for refining the molten charge. In such batch treatment oxygen may be introduced into a vessel, called a converter, containing a molten charge of predetermined volume, the charge batch being subjected to the action of the oxygen for a period sufficient to refine the entire contents of the converter. Then, the treated molten batch is usually poured into a ladle or ingot mold for further processing. This refining process is then repeated with a new batch of molten metal drawn from the furnace.

Such batch treatments have certain inherent disadvantages, such as time delays attendant on the intermittent emptying and refilling of the converter for each charge to be refined, the prolonged refining period required due to the comparatively large volume of molten material in each charge, the relatively large sizes of converters necessary to economically process steel on a large scale, and the lack of uniformity of the refined steel due to variation from batch to batch of the refining conditions. In the making of silicon steel for electrical purposes, for example, such lack of uniformity in the batches of refined steel is particularly troublesome in view of the greater sensitivity of electrical grades of steel to variations in impurity content, crystal structure and other properties of the steel.

It is an object of the invention to provide an improved method and apparatus for making steel.

It is another object of the invention to provide a method and apparatus for making steel on a continuous basis from the smelting stage through intermediate refining and purifying stages to the finally solidified steel product.

It is a particular object of the invention to provide a continuous process of refining molten pig iron into steel, especially of electrical grade, and apparatus therefor.

In accordance with the invention, a continuous steelmaking process is provided which comprises continuously introducing molten unrefined iron into a refining vessel, continuously refining the thus introduced molten iron by moving the molten metal through the refining vessel in a relatively shallow stream while directing an oxygen or oxygen-rich gaseous stream countercurrently against the moving stream of molten metal, separating the slag from the thus refined molten metal and continuously casting the thus obtained refined molten steel into solidified form.

In a particular embodiment of the present invention, the refining vessel is rotated during the refining process to enhance the purifying process by providing more thorough contact of the oxygen-containing gas with the molten iron charge. In another embodiment of the invention, the combined action of a pair of oxygen-supplying nozzles is utilized to improve the oxidizing reaction and accelerate the purifying treatment. In still another embodiment of the invention, there is provided a stationary vessel having an inner surface of particular contour to contribute to the effective refining of the molten iron stream as it passes in contact with the refining oxygen-containing blast.

The invention will be better understood from the following description taken in conjunction with the accompanying drawings, in which:

Fig. 2 is an elevational view in section of another embodiment of continuous refining device which may be alternatively used in the Fig. 1 assembly; and Fig. 3 shows still another form of continuous refining device which may be employed in accordance with the present invention.

Figure 1:
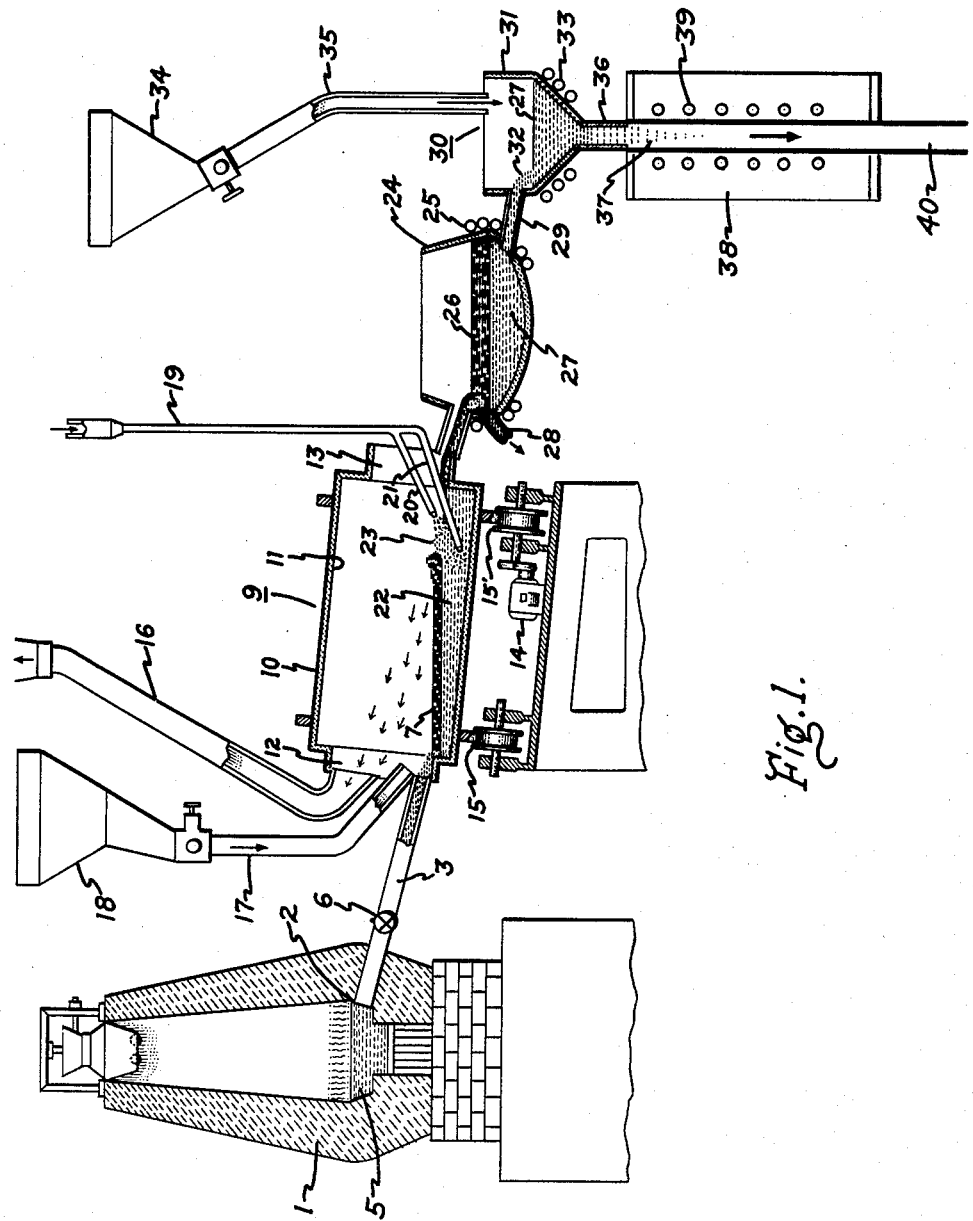
Fig. 1 illustrates somewhat schematically a continuous steelmaking assembly arranged and constructed in accordance with the present invention, and showing one embodiment of a continuous refining device which may be incorporated therein.

Referring now to the drawings, and particularly to Fig. 1, there is shown an assembly adapted to form solid steel products on a continuous basis from the initial stage where molten metal is drawn from a blast furnace and passed through intermediate stages of refining, slag-forming, slag-separating, and alloying to the final casting of the refined metal into solid state. As will be understood, the component parts of the assembly are shown schematically only and the relative sizes of the devices as drawn are not intended to correspond to those used in actual practice.

The continuous steelmaking and casting system comprises as the first stage a blast furnace 1 of usual type in which molten pig iron is formed by reduction from iron ore on a continuous basis in a manner and by reactions well known in the art. Through outlet or notch 2, molten pig iron is continuously drawn from furnace hearth 5 through conduit 3 directly into continuous refining apparatus 9. Conduit 3 is equipped with a suitable valve 6 by means of which the volume of molten iron flow can be regulated as desired.

The size and production rate of blast furnace 1 may in practice be such that it could feed simultaneously a plurality of continuous steelmaking assemblies of the type shown in Fig. 1, it being necessary only to provide individual conduits from the hearth tap to the respective assemblies.

In the refining stage of the steelmaking process impurities are removed from the molten pig iron usually by the addition of oxygen which causes a high temperature oxidation reaction to take place. In this reaction, impurities such as carbon, silicon, manganese, sulfur and other undesired elements are oxidized and, with the aid of slag-forming additives, form a slag which rises to the top of the molten metal and can be readily removed.

In accordance with the invention, refining apparatus is provided which is adapted to refine the molten pig iron in a continuous process as the molten metal moves through the apparatus from entrance to exit on its way to further processing stages. In Fig. 1, one embodiment of such a refining apparatus is shown, which comprises an enclosed, gradually inclined rotatable cylindrical vessel 10 having a suitable refractory lining 11, and inlet 12 and outlet 13 at opposite ends. Lining 11 may be of the acidic type composed of silica or of the basic type composed of calcined magnesite. Refining vessel 10 is supported on rollers 15, 15' in rolling relation therewith, and is rotatable about its longitudinal axis by means of motor 14 driving one or more of the rollers. While only one pair of rollers is shown it will be apparent that additional roller or other non-frictional supporting means (not shown) would in practice be arranged around the cylindrical vessel 10 to properly support it during rotation.

Opening into vessel 10 at its inlet 12 is an exhaust stack 16 for the removal of gaseous products of the refining reaction. Also leading into inlet 12 of vessel 10 is conduit 17 from hopper 18 holding slag-forming ingredients such as limestone, iron oxide, silica, and fluorspar, for delivery to the molten material in vessel 10. The slag formed thereby is an important factor in the refining reaction. As shown in Fig. 1, the slag 7 forms a covering layer overlying the molten metal 22 as it flows through refining vessel 10.

At the outlet end of vessel 10, a supply line 19 is arranged branching into lances or nozzles 20 and 21 for supplying a stream of oxygen or oxygen-rich atmosphere under pressure to the interior of vessel 10. The arrangement of lances 20 and 21 is such that they direct the oxygen stream countercurrently against the flow of the molten metal 22, the oxygen stream being directed at a low impingement angle. Lance 21 is arranged so that its orifice is below the surface of the molten metal pool, which is formed at the outlet end due to the spacing of outlet 13 somewhat above the bottom, i.e., radially inwardly, of vessel 10. Lance 20, on the other hand, is disposed somewhat above the molten metal surface and is employed for surface blowing the molten metal stream, its low impingement angle enabling the oxygen blast to displace slag layer 7 away from a substantial area 23 of the molten iron surface to enable intimate contact and better reaction between the oxygen and the flowing molten metal.

In the operation of refining apparatus 9, a stream of molten pig iron from blast furnace 1 continuously passes into vessel 10 and overflows through outlet 13 while vessel 10 is rotated. The oxygen stream issuing under pressure from submerged lance 21 agitates the molten iron and subjects it to a thorough oxidizing and purifying reaction. Such bottom blown action coupled with the surface blowing action of upper lance 20 ensures the refining of all portions of the molten pig iron as it moves progressively past the oxygen-supplying lances 20, 21 and out through outlet 13.

The rotation of vessel 10 further serves to keep the molten metal in motion and affords the added advantage of providing a mixing action between the slag and the molten iron to increase the effectiveness of the purification process. At the same time, the spreading out of the molten iron as a result of such rotation also lessens the depth of the molten stream. All these factors contribute to a rapid but thorough purifying reaction which is necessary to effectively refine the steadily moving molten metal while the raw iron is continuously introduced into, and the purified metal removed from the refining vessel 10.

From the continuous refining apparatus 9, the purified molten iron together with the slag covering thereon passes into a slag-separator vessel 24 equipped with heating coils or other heating mechanism 25. Here, the substantially complete separation of slag 26 and refined steel 27 takes place, with slag 26 continuously being removed through spout 28 and refined steel passing out through conduit 29 to a continuous casting apparatus 30.

In casting apparatus 30, which may be of known construction, a crucible or tundish 31 is arranged for receiving the molten steel 32 to be cast into solid form. Alloy hopper 34 is arranged with duct 35 leading therefrom to tundish 31 for supplying alloying ingredients such as manganese, chromium, nickel, or other materials to be incorporated in the finished steel product. For producing electrical grade steel, silicon in the necessary proportion could be added at this stage. Tundish 31 is provided with induction heating coils 33 which are also operative as induction stirring means to mix the alloy ingredients with the steel in accordance with known practice. Bottom outlet 36 of tundish 31 leads into a die passage 37 in a continuous casting mold 38 having suitable cooling or temperature-regulating means, such as hollow coils 39 for passage of coolant fluid. The molten steel 27 passes through die 37 which may be of slab-producing form, for example, and during its passage gradually solidifies and emerges from the lower end of mold 38 in the form of a continuous steel slab 40 which may be cut in the lengths desired.

The particular continuous casting device 30 shown is only one of a variety of known arrangements which could be used in the continuous casting stage of the steelmaking procedure.

Fig. 2 illustrates in section a different embodiment of refining vessel which could be employed instead of vessel 10 shown in Fig. 1. The Fig. 2 embodiment comprises an inclined rotatable elongated vessel 45 having a refractory lining 46 and mounted on rollers 47, 47' for rotation by motor means 8 about its longitudinal axis. Inserted in outlet 49 of vessel 45 is oxygen-supplying lance 51 with its orifice immersed in a pool formed by the molten metal at the outlet end of the vessel. Lining 46 in this modification is formed on its surface with a helical groove 48 so arranged that during rotation of vessel 45 with molten metal 22' passing through it, a substantial portion of the molten metal is carried back towards inlet 50 by the helical groove to effect a recirculation of the molten metal. In the illustrated arrangement vessel 45 would be rotated counterclockwise as viewed from the outlet end to produce the desired action. Such recirculation enables a complete reaction to take place between the oxygen jet and the impurities in all portions of the molten iron before it leaves the refining chamber. In this, as in the other disclosed embodiments, the oxygen blast is directed countercurrently against the downwardly flowing molten stream in a manner to intimately contact and agitate the molten iron. While only a bottom blowing, i.e., submerged, oxygen nozzle 51 shown in the Fig. 2 device, it will be evident that a combined bottom and surface blowing arrangement could be employed as shown in Fig. 1 if desired.

The helically grooved device of Fig. 2 provides all the advantages due to rotation of the chamber as previously described in connection with Fig. 1, and in addition affords a more thorough mixing of the molten contents due to the recirculation action. The ridges of the grooves also serve to lessen the depth of molten metal stream as it passes over them, a factor which further contributes to a more rapid refining reaction between the oxygen and the metal.

Similarly to the previously described embodiment, an exhaust stack 16', a supply conduit 17' for introducing slag-forming additives, and molten pig iron conduit 3' are arranged at the inlet 50 of vessel 45.

Fig. 3 illustrates a stationary type of continuous refining vessel which may be employed instead of the rotary forms of refiners described above. In this modification, elongated vessel 55, which is preferably of rectangular cross section, is provided with a refractory lining 56 having an undulate upper surface 57 and an undulate lower surface 58. The inlet end of vessel 55 through which molten pig iron 61 is introduced from the blast furnace communicates with an exhaust stack 59 which may be integral with vessel 55, a delivery conduit 62 also integral with vessel 55 being provided for introducing slag-forming ingredients. The amount of molten iron continuously introduced into vessel 55 is such that in flowing over the crests of ridges 63 on the vessel floor 58, the molten iron 61 is spread out in a thin sheet and accumulates in pools behind each of the lining ridges 63. Oxygen-supplying lance 60, of which more than one may be employed, is arranged to direct the oxygen blast countercurrently against the molten material as it flows in a thin stream over the last ridge 63'. The undulating contour of roof 57 is so formed that the rear slope 57a of each upper ridge 65 extends in a direction generally toward a region on the rear slope 58a of the floor ridge beneath which is somewhat rearward, i.e., downstream, of the crest of the floor ridge. By virtue of this arrangement, the upper ridges 65 successively direct the oxygen stream downwardly against the lower ridges in an area where the molten iron is in a thin layer. The concentration of the oxygen stream at the points of impingement on the lower ridges 63 also serves to blast away the covering slag layer 64 flowing concurrently downward, thus allowing better reaction between the metal and the oxygen stream.

The movement of the oxygen stream and the molten iron flow is such as to allow the molten slag to accumulate in comparatively deep layers on top of the pools of iron held in the valleys of the floor surface. At these points, therefore, slag purification of the liquid iron would mainly take place. By the construction described, there is thus obtained the combination of full purification effects of both the oxygen and the slag.

The stationary refining vessel of Fig. 3 provides certain advantages over the previously described rotating vessels, such as reduced cost, ready installation, easier ingress and egress of iron and slag ingredients, as well as easier disposition of the exhaust gases and smoke.

In general, the continuous refining of molten iron is effected in accordance with the invention by subjecting the molten iron in a relatively shallow molten stream to the action of an oxygen-rich gaseous blast directed countercurrently to the molten stream, with the provision of a relatively large area of contact between the oxygen and metal and a constant mixing action due to the force and location of the oxygen stream and additionally by the rotation of the refining vessel itself. There is thus afforded a rapid but thorough purification of the molten metal as it flows past the oxygen blast, thus making possible the refining of the molten iron in a continuous operation. Where coupled, as described herein, at its inlet with a smelting means such as a blast furnace which reduces iron ore to molten pig iron in a continuous operation and at its outlet with continuous steel casting apparatus of known type, a complete steelmaking system is established which has a continuous production flow from the iron ore stage to the casting of the final solid steel product. Such a system enables the attainment of a very high production rate at relatively low operating cost while affording the advantage of greater uniformity of the product as compared to that produced in the usual batch processes.

While the refining device of the invention has been described and shown as a component of a continuous overall steelmaking system and provides particular advantages in such a combination, the invention is not limited thereto, and various modifications may be made in the arrangement shown without going outside the scope of the invention. For example, instead of providing for continuous flow of molten iron from the blast furnace or other source to the continuous refining device, the furnace may be tapped intermittently in accordance with prior practice, and the molten iron delivered by ladle to a holding vessel (not shown) which may be suitably heated and from which the molten pig iron may be continuously delivered to the continuous refining device. It will also be evident that the continuous refining device may be utilized otherwise than in combination with a continuous casting device, and could if so desired be used for refining molten steel which is thereafter poured into molds for making separate ingots or other shapes of steel products in the usual manner.

Accordingly, while the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. In a continuous steel producing and casting apparatus including molten iron producing means, slag-separating means and continuous casting means, continuous refining means adapted to continuously refine the molten iron received from the molten iron producing means, comprising an enclosed elongated vessel having an inlet and an outlet at opposite ends and inclined gradually downwardly from its inlet to its outlet end for passing molten iron from said molten iron producing means in a continuous flow along the bottom of the vessel from inlet to outlet for passage to the slag-separating means and continuous casting means, means for supplying slag-forming material to said molten iron as it enters said enclosed elongated vessel, so that a slag layer is formed therein overlying said flowing molten iron and flowing concurrently therewith, and gas-supply means opening into said vessel near its outlet end for directing a stream of oxygen-containing gas countercurrently against said flowing molten iron and slag.

2. Apparatus for continuously refining molten pig iron comprising an enclosed elongated cylindrical vessel having an inlet and outlet at opposite ends and inclined gradually downwardly from inlet to outlet end for passing molten pig iron in a continuous flow therethrough along the bottom of the vessel, said vessel being mounted for rotation about its longitudinal axis, means for rotating said vessel, and gas-supply means opening into said vessel near its outlet end for introducing oxygen-containing gas into said vessel and directing the gas countercurrently against said flowing molten iron while said vessel rotates about its axis.

3. Apparatus for continuously refining molten pig iron comprising an enclosed elongated cylindrical vessel having an inlet and outlet at opposite ends and inclined gradually downwardly from inlet end to outlet end for passing molten pig iron in a continuous flow therethrough along the bottom of the vessel, said vessel being mounted for rotation about its longitudinal axis, means for rotating said vessel, and gas-supply means opening into said vessel near its outlet end for introducing oxygen-containing gas into said vessel and directing the gas countercurrently against said flowing molten iron while said vessel rotates about its axis, the outlet of said vessel being spaced radially inwardly so as to provide for the formation of a pool of molten iron at the outlet end as it flows out of said vessel, said gas-supply means including a nozzle arranged with its orifice beneath the surface of the molten iron pool.

4. Apparatus for continuously refining molten pig iron comprising an enclosed elongated cylindrical vessel having an inlet and outlet at opposite ends and inclined gradually downwardly from inlet end to outlet end for passing molten pig iron in a continuous flow therethrough along the bottom of the vessel, said vessel being mounted for rotation about its longitudinal axis, means for rotating said vessel, and gas-supply means opening into said vessel near its outlet end for introducing oxygen-containing gas into said vessel and directing the gas countercurrently against said flowing molten iron while said vessel rotates about its axis, the outlet of said vessel being spaced radially inwardly so as to provide for the formation of a pool of molten iron at the outlet end as it flows out of said vessel, said gas-supply means comprising a pair of nozzles one of which is arranged to direct a jet of said gas against the surface of the molten iron stream and the other arranged to introduce a jet of gas beneath the surface of the molten iron pool.

5. Apparatus for continuously refining molten pig iron comprising an enclosed elongated cylindrical vessel having an inlet and outlet at opposite ends and inclined gradually downwardly from inlet to outlet end for passing molten pig iron in a continuous flow therethrough along the bottom of the vessel, said vessel being mounted for rotation about its longitudinal axis, said vessel having an interior surface formed with a helical groove for recirculating the molten iron stream during rotation of said vessel, means for rotating said vessel, and gas-supply means opening into said vessel near its outlet end for supplying oxygen-containing gas to the interior of said vessel and directing the gas countercurrently against said flowing molten iron while said vessel rotates about its axis.

6. Apparatus for continuously refining molten pig iron comprising an enclosed elongated vessel having an inlet and outlet at opposite ends and having upper and lower interior surfaces extending between said ends, said vessel being inclined generally gradually downwardly from its inlet to its outlet end so that a molten iron stream is adapted to continuously flow therethrough along the bottom of the vessel, the upper and lower surfaces of said vessel having contours of undulating form, and gas-supply means opening into said vessel near its outlet end for introducing a stream of oxygen-containing gas countercurrently against the flowing molten iron.

7. Apparatus for continuously refining molten pig iron comprising an enclosed elongated vessel having an inlet and outlet at opposite ends and having upper and lower interior surfaces extending between said ends, said vessel being inclined generally gradually downwardly from its inlet to its outlet end so that a molten iron stream is adapted to continuously flow therethrough along the bottom of the vessel, the upper and lower surfaces of said vessel having contours of undulating form, the undulating contour of said surfaces forming a series of ridges on each surface having rear slopes facing the outlet end of said vessel, the rear slope of each upper ridge extending in a direction generally toward a region on the rear slope of the ridge directly below it slightly rearward of the crest thereof, and gas-supply means opening into said vessel near its outlet end for introducing a stream of oxygen-containing gas countercurrently against said flowing molten iron, whereby the upper ridges successively direct the gas stream toward said region of each lower ridge.

8. An apparatus as defined in claim 7, wherein said vessel is provided at its inlet end with an exhaust duct for removing gases therefrom and a supply duct for introducing slag-forming material therein, said ducts being integral with said vessel.

9. An apparatus as defined in claim 8, wherein the means for introducing the oxygen-containing gas comprises a nozzle member inserted into said vessel through its outlet and arranged to direct the gas stream against the rear slope of the rearmost lower ridge.

References Cited in the file of this patent

UNITED STATES PATENTS

| | | |
|---|---|---|
| 137,025 | Rand | Mar. 18, 1873 |
| 1,939,874 | Brassert | Dec. 19, 1933 |
| 2,061,741 | Rosenfeldt | Nov. 24, 1936 |
| 2,302,999 | O'Brien | Nov. 24, 1942 |
| 2,574,764 | Smalley | Nov. 13, 1951 |
| 2,598,393 | Kalling et al. | May 27, 1952 |
| 2,693,411 | Cremer | Nov. 2, 1954 |
| 2,817,584 | Kootz et al. | Dec. 24, 1957 |

FOREIGN PATENTS

| | | |
|---|---|---|
| 1,143 | Great Britain | 1864 |
| 12,363 | Great Britain | 1886 |

OTHER REFERENCES

Stahl and Eisen, vol. 77 (1957), pages 1–10, January 10, 1957.

Graef et al.: "Rotor Steelmaking Process," Journal of Metals, November 1957, pages 1435–1439 (pages 1436–37 relied on).